Dec. 14, 1926.

H. R. LORANGER ET AL 1,610,869

COMPRESSOR FOR REFRIGERATING APPARATUS

Filed June 12, 1922    2 Sheets-Sheet 1

Inventors
Hubert R. Loranger
Ubald R. Loranger

By Whittemore Hulbert Whittemore Belknap
Attorneys

Dec. 14, 1926.
H. R. LORANGER ET AL
1,610,869
COMPRESSOR FOR REFRIGERATING APPARATUS
Filed June 12, 1922   2 Sheets-Sheet 2
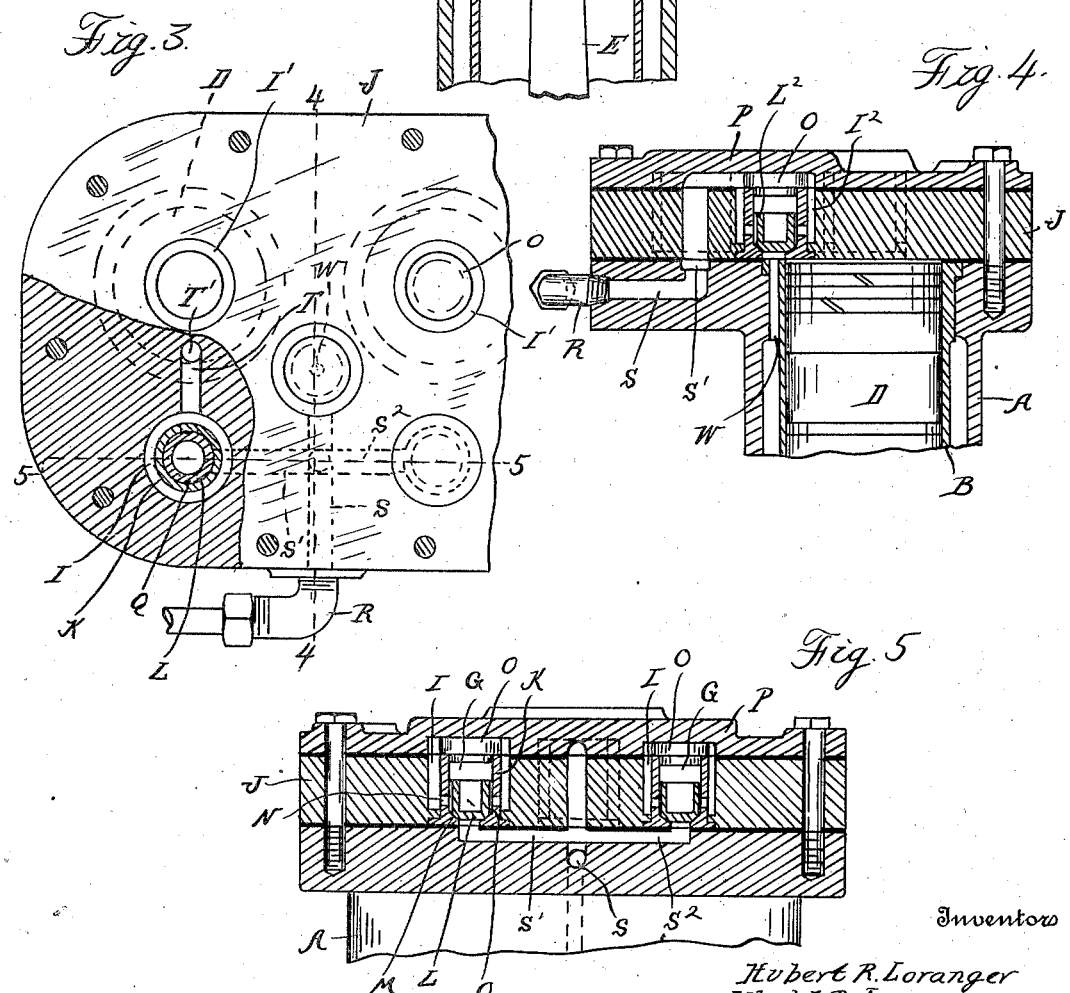

Patented Dec. 14, 1926.

1,610,869

UNITED STATES PATENT OFFICE.

HUBERT R. LORANGER OF HIGHLAND PARK, MICHIGAN, AND UBALD R. LORANGER, OF RIVERSIDE, ONTARIO, CANADA.

COMPRESSOR FOR REFRIGERATING APPARATUS.

Application filed June 12, 1922. Serial No. 567,713.

The invention relates to refrigerating apparatus more particularly designed for domestic installations and of that type in which a gas, such as sulphur dioxide, is used as the refrigerating agent. The refrigerating gas is alternately compressed and expanded and as it has a very disagreeable odor, it is highly desirable to prevent any escape of the same from the system. For compressing the gas it is usual to employ a compressor of the reciprocating piston type, the piston or pistons being actuated by pitmen connections to a rotating crank shaft. With certain constructions the gas to be compressed is first introduced into the crank case and is transferred therefrom to the cylinder, where it is compressed on the upward stroke of the piston. The pressure at which the gas is introduced into the crank case depends upon the setting of the expansion valve and at times this pressure is sufficient to interfere with the efficient operation of the compressor. Also, there is a tendency for the gas in the crank case to leak through the bearings and to thus escape into the room.

It is the object of the present invention to prevent the escape of any gas; first, by introducing into the upper end of the cylinders instead of by way of the crank case, and; second, by periodically connecting the crank case with the suction side of the compressor so as to remove any gas that may leak past the pistons into said crank case. The invention further relates to the peculiar construction of valve that is used and the arrangement of these valves as hereinafter set forth.

In the drawings:

Figure 2 is a section at right angles to Fig. 1;

Figure 3 is a sectional plan view on line 2—2 of Figure 2;

Figure 4 is a section on line 4—4 of Figure 3;

Figure 5 is a section on line 5—5 of Figure 3.

Figure 1:
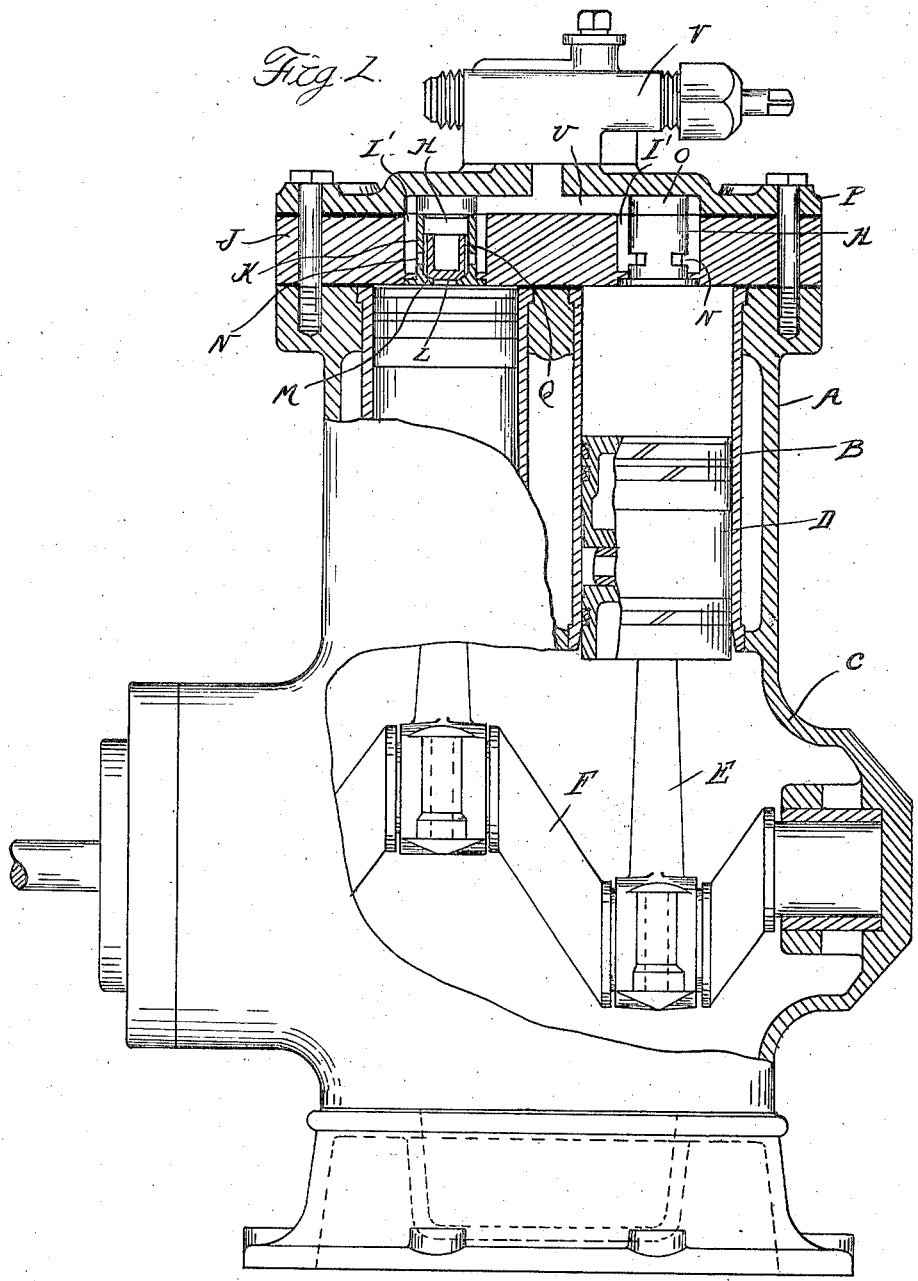
Figure 1 is a sectional elevation of the compressor.

A is the casing of the compressor including the cylinders B and the crank case C. D are the pistons within the cylinders, E the pitman rod connections, and F the crank shaft, one end of which extends outward through bearings in the end of the crank case. G are inlet valves and H the outlet valves for the compressor, which are respectively connected with the inlet and outlet gas conduits. As shown, these valves are arranged in recesses I in the valve plate J and each comprises a cylindrical casing K and a hollow or cup-shaped piston L slidable therein. The pistons L form poppet valves which on their lower faces engage bevelled seats M in the casing K and above these seats are the ports N in the walls of the casing K. A cover plate O closes the top of the casing K and this is held down by a top plate P. The valve L has a restricted channel Q extending longitudinally at one side thereof, permitting the movement of air or gas inward and outward with respect to the casing K. Thus, when the valve L is unseated, the compressed gas within the casing K forms a dash-pot which retards its movement and prevents noise. Also, the compression assists in unseating the valve, which, however, would normally seat by gravity. Again, as the valve is hollow and very light, the inertia factor is relatively small, particularly if a light metal such as aluminum is used in the valve construction.

To facilitate the placing and arrangement of the valves in the compressor casing, the engine head J has the recesses I formed therein from the upper side, and these recesses are closed by the top plate P. The gas is introduced through a connecting fitting R and passes through a channel S, which, in case of a two-cylinder compressor such as is illustrated, divides into the branches S' and S² leading to the inlet valves beneath the seats thereof. When the valves are open, the gas is free to pass upward and out through the ports N into the annular chambers I and from the latter through channels T and downwardly-extending ports T' into the compressor cylinders. Therefore, on each suction stroke of the compressor the gas will be drawn through these passages and past the valves into the cylinders and upon the compression stroke will close the valves.

The outlet valves are of similar construction, the compressed gas in the cylinder passing upward through the port in the valve seat and outward through the ports P in the valve casing K into the chambers I'. From the latter the compressed gas passes through a channel U to the fitting V, which connects the same with the external conduits.

To relieve the crank case from any compression, due to the leakage of gas by the pistons, there is a connecting channel W between the crank case and a chamber I² containing another valve L². This valve is of the same construction as those already described and is arranged to be unseated whenever the pressure within the crank case is in excess of the pressure in the channel S, which channel extends to the chamber I². The arrangement is such that each suction stroke of the piston will have a tendency to lift the valve L², equalizing the pressure in the crank case with that in the channel S. This will effectually prevent the building up of pressure in the crank case and will also prevent leakage through the bearings into the room.

In operation, the compressor is almost free from valve noise, which is highly desirable in an installation placed in a private house. Also, as above stated, it is free from crank case compression and from leakage of gas.

What we claim as our invention is:

1. A compressor for a refrigerating apparatus, comprising a cylinder, a piston therein, a crank shaft, a pitman connection between said crank and piston, a crank case, inlet and outlet connections communicating with the upper end of said cylinder, gravity seated valves in said inlet and outlet connections, a connection between said inlet and outlet connection and the crank case, and a gravity seated valve in the latter connection adapted to be opened when the suction pressure is less than the pressure in the crank case.

2. A compressor for a refrigerating apparatus, comprising a cylinder, a piston therein, a crank, a pitman connection between said crank and piston, a crank case, a head for said cylinder having chambers therein connected respectively with the inlet and outlet for said cylinder, valves in said chambers gravity seated, and a dash-pot for each valve to check the acceleration thereof.

3. A compressor for a refrigerating apparatus, comprising a cylinder, a piston, a crank shaft, a pitman connection between said crank shaft and piston, a closed crank case, a head for said cylinder having a plurality of recesses therein, inlet and outlet connections for said cylinder communicating with two of said recesses, a connection from said crank case to a third recess, and valves in said recesses seated by gravity, said inlet valve and crank-case valve being unseated on the suction stroke and said outlet valve being unseated on the compression stroke, and dash-pots for retarding the acceleration of said valves to quiet the operation thereof.

4. A compressor for a refrigerating apparatus, comprising a cylinder, a piston therein, a crank shaft, a pitman connection between said crank shaft and piston and an enclosed crank case for said crank shaft, of means for admitting and discharging the fluid to be compressed at the upper end of said cylinder, a connection between said closed crank case and the admission passage, and a check valve in said connection adapted to be automatically opened when the pressure in the crank case exceeds that in said admission passage.

In testimony whereof we affix our signatures.

HUBERT R. LORANGER.
UBALD R. LORANGER.